(12) United States Patent
Rao et al.

(10) Patent No.: US 9,716,687 B2
(45) Date of Patent: Jul. 25, 2017

(54) DISTRIBUTED GATEWAYS FOR OVERLAY NETWORKS

(71) Applicant: Cisco Technology, Inc., San Jose, CA (US)

(72) Inventors: Dhananjaya Rao, Milpitas, CA (US); Vipin Jain, San Jose, CA (US); Parag Bhide, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 521 days.

(21) Appl. No.: 14/308,790

(22) Filed: Jun. 19, 2014

(65) Prior Publication Data

US 2015/0372869 A1    Dec. 24, 2015

(51) Int. Cl.
| | | |
|---|---|---|
| *G06F 15/173* | (2006.01) | |
| *H04L 29/12* | (2006.01) | |
| *H04L 12/46* | (2006.01) | |

(52) U.S. Cl.
CPC ...... *H04L 61/6022* (2013.01); *H04L 12/4633* (2013.01); *H04L 61/103* (2013.01); *H04L 61/6009* (2013.01)

(58) Field of Classification Search
CPC .......................... H04L 61/60; H04L 12/4633
USPC ........................................................ 709/224
See application file for complete search history.

(56) References Cited

U.S. PATENT DOCUMENTS

| | | | |
|---|---|---|---|
| 6,202,169 B1 * | 3/2001 | Razzaghe-Ashrafi | G06F 11/20 714/1 |
| 8,166,205 B2 | 4/2012 | Farinacci et al. | |
| 8,645,576 B2 | 2/2014 | Farinacci et al. | |
| 2004/0043797 A1 * | 3/2004 | Shostak | H04W 52/0216 455/574 |
| 2004/0095943 A1 * | 5/2004 | Korotin | H04L 29/12009 370/401 |
| 2004/0109472 A1 * | 6/2004 | Choyi | H04L 29/12028 370/466 |
| 2004/0187030 A1 * | 9/2004 | Edney | H04L 12/2856 726/13 |
| 2009/0172151 A1 * | 7/2009 | Davis | H04L 29/12264 709/224 |
| 2011/0317700 A1 * | 12/2011 | Assarpour | H04L 12/4625 370/392 |
| 2013/0266019 A1 | 10/2013 | Qu et al. | |
| 2013/0318219 A1 * | 11/2013 | Kancherla | H04L 49/70 709/222 |
| 2013/0336326 A1 * | 12/2013 | Li | H04L 29/12028 370/392 |
| 2013/0339547 A1 * | 12/2013 | Nath | H04L 61/103 709/245 |
| 2014/0059111 A1 | 2/2014 | Veeraiyan | |
| 2015/0263899 A1 * | 9/2015 | Tubaltsev | H04L 45/02 370/254 |
| 2016/0036773 A1 * | 2/2016 | Luo | H04L 12/4604 370/392 |

* cited by examiner

*Primary Examiner* — Duyen Doan
(74) *Attorney, Agent, or Firm* — Edell, Shapiro & Finnan, LLC

(57) ABSTRACT

Techniques provided herein enable a set of independent, unconnected devices in a network to support distributed Layer 3 (L3) gateway functionality for an overlay based virtual network by intelligently triggering proxy addressing information updates.

21 Claims, 5 Drawing Sheets

DISTRIBUTED GATEWAYS FOR OVERLAY NETWORKS

TECHNICAL FIELD

The present disclosure relates to distributed gateways in overlay networks.

BACKGROUND

Network virtualization is used to create logical networks that are decoupled from the underlying network nodes. These virtual networks, sometimes referred to as "overlays" or "overlay networks," are comprised of virtual nodes and logical links built on top of an existing network. The underlying physical networking nodes in the existing network are responsible for forwarding packets, but the virtual network nodes provide an abstraction that facilitates deployment and management of network services.

Virtual overlay network (network virtualization) technologies have become increasingly important due to the need for segmentation and connectivity of virtual workloads in, for example, data centers. A Virtual Extensible Local Area Network (VXLAN) is an example of a virtual overlay network technology. VXLAN encapsulates Media Access Control (MAC)-based Layer 2 (L2) Ethernet frames within Layer 3 (L3) packets using encapsulation that is similar to the encapsulation used in virtual local area network (VLAN) techniques. More specifically, VXLAN extends the VLAN address space by adding a 24-bit segment identifier (ID) and increasing the number of available IDs to 16 million. The VXLAN segment ID in each frame differentiates individual logical networks so millions of isolated L2 VXLAN networks can co-exist on a common L3 infrastructure. As with VLANs, only virtual machines (VMs) within the same logical network are able to communicate with each other.

DESCRIPTION OF EXAMPLE EMBODIMENTS

Overview

Techniques provided herein enable a set of independent and unconnected devices in a network to support distributed Layer 3 (L3) gateway functionality for an overlay based virtual network by intelligently triggering proxy addressing information updates. In accordance with one example, a first gateway node forms part of a virtual anycast gateway of an overlay network. The virtual anycast gateway includes one or more other gateway nodes (peer gateway nodes). The first gateway node determines that one or more entries in an addressing information database stored on a second gateway node are inconsistent with corresponding entries in an addressing information database stored on the first gateway node. The first gateway node identifies the one or more addressing information entries stored on the second gateway node that are inconsistent with corresponding addressing information entries stored on the first gateway node as inconsistent addressing entries. For at least one inconsistent addressing entry, the first gateway node sends a proxy addressing information request on behalf of the second gateway node to a host node associated with the corresponding inconsistent addressing entry, thereby triggering a response from the host that will ensure the addressing information on the second gateway node is updated and hence made consistent.

Example Embodiments

Figure 1:
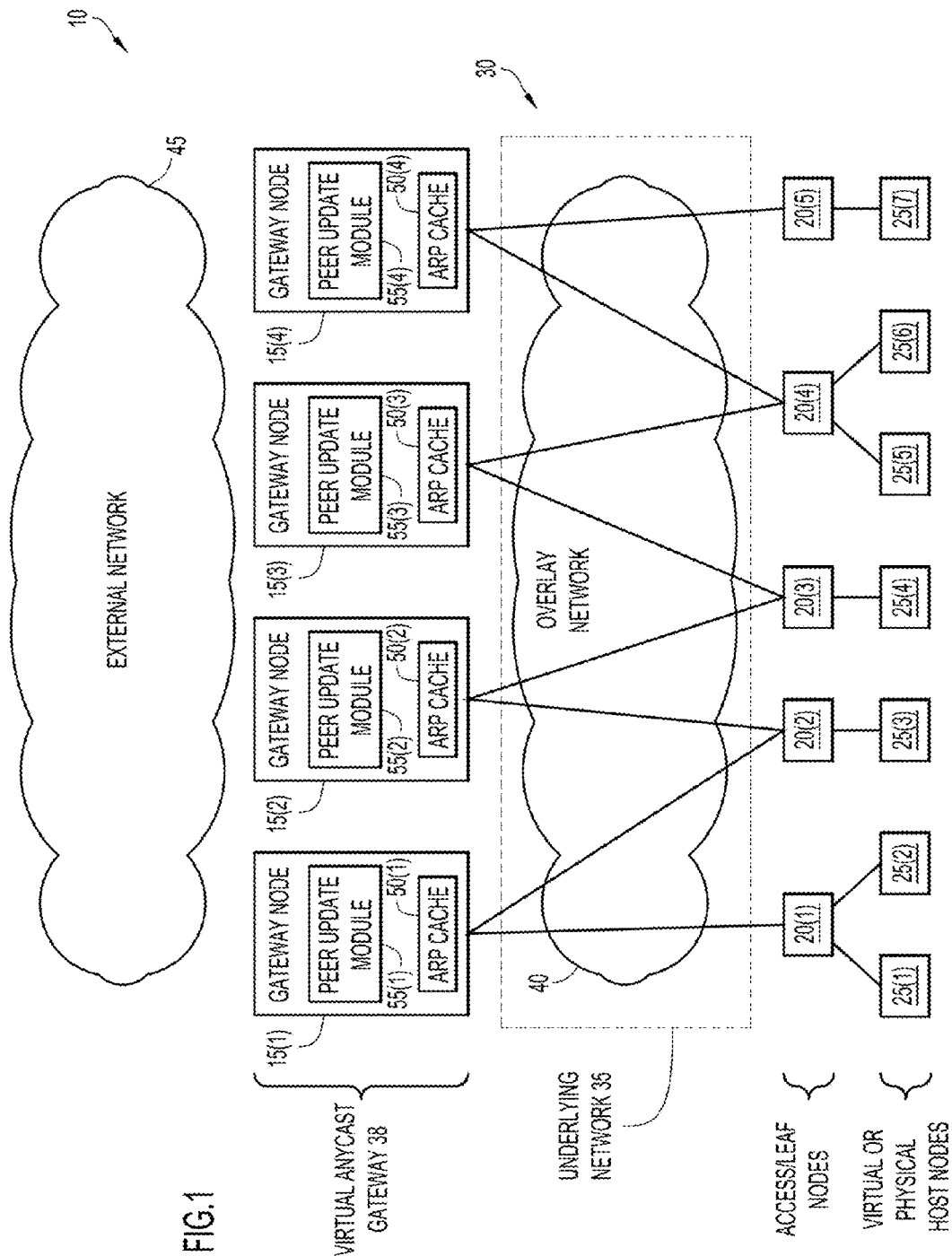
FIG. 1 is a schematic diagram of a computing network having an anycast gateway that includes a plurality of active distributed gateway nodes, according to an example embodiment.

FIG. 1 is a block diagram of a computing network 10 in which indirect peer update techniques in accordance with examples presented herein may be implemented. Computing network 10 comprises four (4) gateway nodes (gateways) 15(1)-15(4), five (5) access (leaf) nodes 20(1)-20(5), and seven (7) host nodes 25(1)-25(7). It is to be appreciated that the architecture of computing network 10 shown in FIG. 1 is merely one example arrangement and that the techniques described herein may be used in other networks having different arrangements. For example, it is to be appreciated that the number of gateway nodes, access nodes, host nodes, etc., shown in FIG. 1 is merely illustrative and any number of nodes may be present.

The host nodes 25(1)-25(7) may be physical or virtual hosts (e.g., physical servers, computers, virtual machines, etc.) that form part of a data center 30. The host nodes 25(1)-25(7) are connected by an underlying Layer 3 (L3) network 35. For ease of illustration, the networking devices that form L3 network 35 have been omitted from FIG. 1.

Running on top of L3 network 35 is an overlay network 40. For ease of illustration, examples are described herein with reference to the use of a VXLAN as the overlay network 40. VXLAN is primarily used as a Layer 2 (L2) overlay network (virtual network) that allows multiple L2 segments to be stretched between switches (e.g., top-of-rack (TOR) switches, virtual switches, etc.) or other network nodes spread across multiple server racks while maintaining the data center core (underlying network 35) as L3. It is to be appreciated that although VXLAN is used as an examples presented herein, the indirect peer update techniques presented herein may be used with other o other overlay encapsulations including, for example, Network Virtualization using Generic Routing Encapsulation (NVGRE) or Multiprotocol Label Switching (MPLS).

In operation, VXLAN 40 (i.e., the L2 overlay network) operates with the L3 gateway nodes 15(1)-15(4) that provide routing within the VXLAN as well as with the attached physical external network 45 (e.g., an external Wide Area Network (WAN)). VXLAN 40 extends between the gateway nodes 15(1)-15(4) and the access nodes 20(1)-20(5) or between the gateway nodes 15(1)-15(4) and the host nodes 25(1)-25(7). That is, upstream traffic sent on VXLAN 40 (i.e., traffic sent by host nodes 25(1)-25(7)) is encapsulated with an overlay header at the host nodes 25(1)-25(7 (hypervisors) or on the access nodes 20(1)-20(5) for transmission to the gateway nodes 15(1)-15(4) for subsequent forwarding. If the upstream traffic is forwarded to external network 45, the gateway nodes 15(1)-15(4) remove the overlay encapsulation. Additionally, downstream traffic received from the external network 45 (i.e., traffic sent from the external network to the host nodes 25(1)-25(7)) is encapsulated with an overlay header at the gateway nodes 15(1)-15(4) for transmission to the host nodes 25(1)-25(7).

FIG. 1 illustrates a "distributed" gateway arrangement where the multiple gateway nodes 15(1)-15(4) are present (e.g., at spine or aggregation layers) and are each enabled to actively forward traffic to/from the hosts nodes attached to VXLAN 40 (i.e., all gateway nodes are concurrently "active" so as to service traffic sent from one host node to another host node, service traffic sent from a host node to the external network, and/or service traffic sent from the external network to a host node). Because the gateway nodes 15(1)-15(4) are all active and able to forward traffic, the gateway nodes are sometimes referred to herein as anycast peer gateway nodes.

The distributed L3 gateway functionality of FIG. 1 can be supported by having each gateway 15(1)-15(4) configured with an overlay encapsulation endpoint (e.g., VXLAN Tunnel End Point) Internet Protocol (IP) address for VXLAN 40. That is, all of the redundant gateway nodes 15(1)-15(4) share one anycast IP address and one anycast MAC address such that, from the perspective of the host nodes 25(1)-25(7), the gateway nodes 15(1)-15(4) logically operate as a single gateway. This logical single gateway is referred to herein as a "virtual anycast gateway" (anycast gateway) 38 because the host nodes 25(1)-25(7) may transmit/receive traffic on VXLAN 40 to/from any one of the gateway nodes 15(1)-15(4) by transmitting traffic to the single IP address. However, the host nodes 25(1)-25(7) are not aware that multiple gateway nodes are present. In this way, the gateway nodes 15(1)-15(4) service a load-share of the overlay traffic that is destined to the overlay encapsulation endpoint address simply by the L3 core devices performing L3 equal-cost multi-path routing (ECMP).

A L3 gateway redundancy protocol, such as the Hot Standby Router Protocol (HSRP) or the Virtual Router Redundancy Protocol (VRRP), can be run on the overlay between the gateway nodes 15(1)-15(4) to detect one another and to determine the master gateway node. That is, these protocols may be used to activate the peer gateway nodes 15(1)-15(4) and to make them aware of one another. A problem that arises from the use of multiple active gateway nodes is that all of the peer gateway nodes need to have consistent addressing information for all of the host nodes that are virtually attached to the overlay. Conventional techniques may use strict synchronization protocols, in addition to the activation/initialization protocols (e.g., HSRP, VRRP, etc.), to coordinate operation of the peer gateway nodes. These synchronization protocols are heavyweight protocols as they require the peer gateway nodes to send information (messages) to one another to ensure that all of the gateway nodes have consistent addressing information for the host nodes on the overlay network. That is, in conventional techniques utilize protocols that enable the gateway nodes send (distribute) addressing information to one another. For example, certain strict synchronization protocols could be proprietary messaging based applications or routing protocols such as Border Gateway Protocol Intermediate (BGP) System to Intermediate System (IS-IS).

It is advantageous to avoid the use of a synchronization protocol requiring the peer gateway nodes 15(1)-15(4) in the virtual anycast gateway 38 to distribute the correct addressing information for the host nodes 25(1)-25(7) to one another. As such, presented herein are techniques that use proxy addressing information requests to indirectly update the gateway nodes 15(1)-15(4) with correct addressing information for the host nodes 25(1)-25(7). In other words, standard addressing information update/distribution protocols are used to indirectly distribute the addressing information to the gateway nodes 15(1)-15(4) without the need to share/distribute host node addressing information with one another (i.e., an explicit synchronization protocol between the gateway nodes 15(1)-15(4) is not utilized).

An example of an addressing information update protocol is the Address Resolution Protocol (ARP). The ARP is used to connect together the various networking layers within a computing network (e.g., to connect the Internet Protocol (IP) and Ethernet networking layers). Since networking hardware such as switches, hubs, routers, and bridges operate on, for example, Ethernet frames, these devices are unaware of the higher layer data carried by these frames. Similarly, IP layer devices, operating on IP packets, need to be able to transmit their IP data on the Ethernet layer. The ARP defines the mechanism by which IP capable hosts can exchange mappings of their Ethernet and IP addressing. The ARP is used primarily used in conjunction with IP Version 4 (IPv4).

More specifically, the ARP may be used to map IP addresses to a host address (i.e., a Media Access Control (MAC) address) that is recognized in the local network. For example, in IP Version 4 (IPv4), an IP address may be 32 bits long, but the Ethernet local area network (LAN) MAC addresses may be 48 bits long. A table, referred to herein as the ARP cache or ARP table, is used to maintain a correlation between each MAC address and its corresponding IP address.

Another example of an addressing information update protocol is the Neighbor Discovery Protocol (NDP) is another protocol in the Internet Protocol suite that is used in conjunction with Internet Protocol Version 6 (IPv6). The NDP is used for, among other tasks, discovery of other nodes and determined the addresses In accordance with examples described herein, a number of different addressing information update protocols may be used to update the addressing information on the peer gateway nodes 15(1)-15(4). For example, the ARP may be used in networks implemented in accordance with IPv4, while NDP may be used in networks executed in accordance with IPv6. For ease of reference, the indirect peer update techniques will be primarily described with reference to use of the ARP. However, it is to be appreciated that these techniques are also applicable to the NDP and other protocols typically used to distribute addressing information in a network.

Each gateway node 15(1)-15(4) includes an addressing information database (ARP cache) 50(1)-50(4), respectively, and a peer update module 55(1)-55(4), respectively. The peer update modules 55(1)-55(4) execute the indirect peer update techniques so as to ensure that the ARP caches 50(1)-50(4) of the gateway node 15(1)-15(4) include consistent and complete addressing information for the host nodes 25(1)-25(7).

Figure 2:
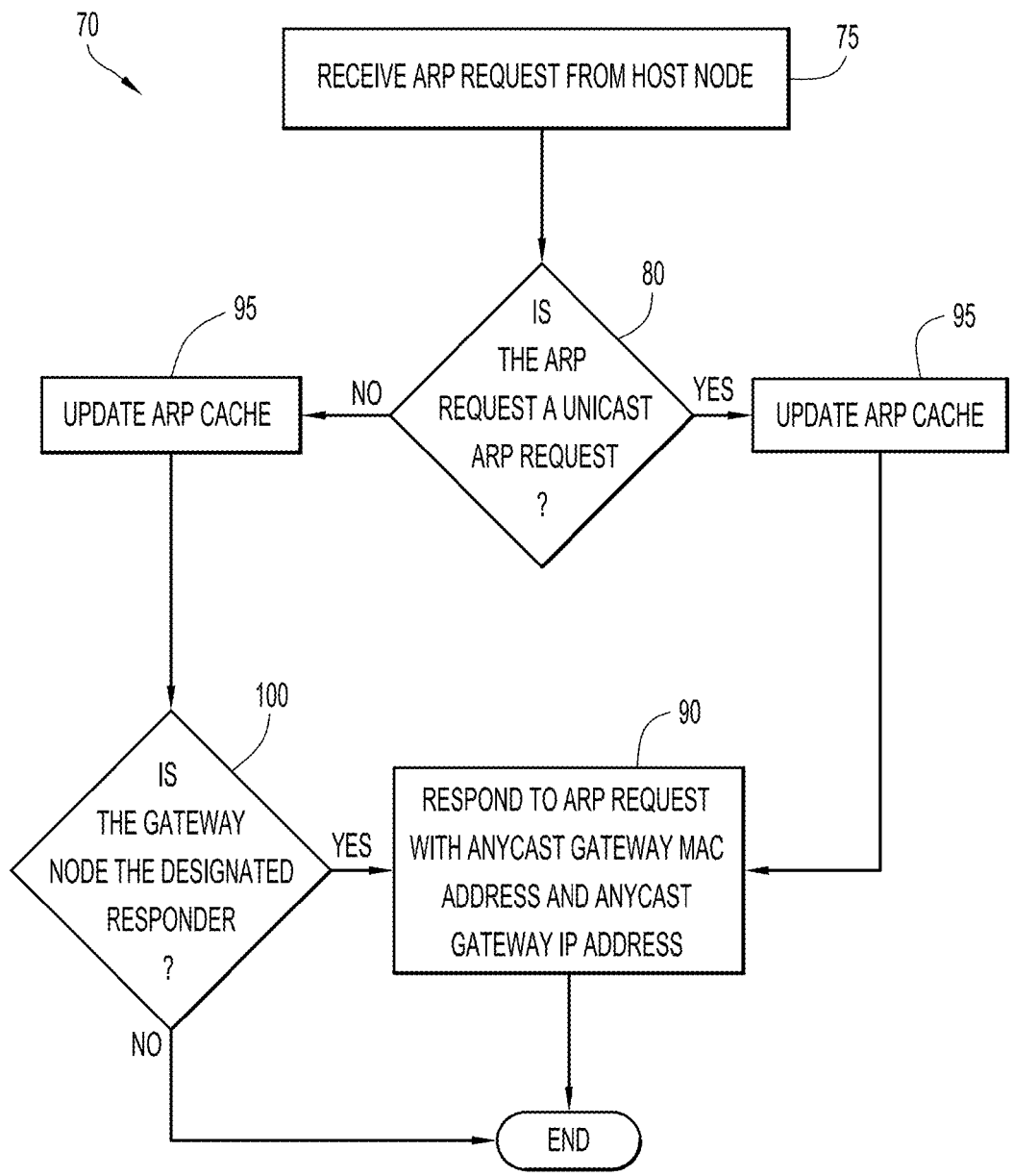
FIG. 2 is a detailed flowchart illustrating a method for processing an addressing information request received at a gateway node forming part of an anycast gateway, according to an example embodiment.

FIG. 2 is a flowchart of a method 70 for processing an ARP request received at a peer gateway node in accordance with examples presented herein. For ease of description, method 70 will be described with reference to the computing network 10 of FIG. 1. Additionally, although the operations of method 70 may be performed at any of the gateway nodes 15(1)-15(4), the example of FIG. 2 will be described with reference to performance of the operations at gateway node 15(1).

Method 70 begins at 75 where gateway node 15(1) receives an addressing information request (e.g., an ARP request) from a host node, such as host node 25(1). In general, an ARP request is a message sent by a first node that requests the receiving node to provide the first node with the addressing information of the receiving node. An ARP request may be a unicast ARP request or a multicast (broadcast) ARP request. A unicast ARP request, sometimes referred to as an "ARP refresh" request, is a request transmitted by a node to confirm that the addressing information currently in its ARP cache for the receiving node is correct. A multicast ARP request is sent when a node needs information for all other nodes (e.g., when the node is first brought online, when its ARP cache is deleted, etc.).

Returning to the example of FIG. 2, at 80 the gateway node 15(1) determines whether the ARP request received from host node 25(1) is a unicast ARP request or a multicast ARP request. If the gateway node 15(1) determines that the ARP request is a unicast ARP request, then at 85 the gateway node 15(1) updates its ARP cache 50(1) with the addressing information for host node 25(1) and, at 90, the gateway node 15(1) responds to the received ARP request. The gateway node 15(1) responds to the received ARP request by providing the host node 25(1) with the anycast gateway virtual MAC address and the anycast gateway virtual IP address (i.e., the MAC and IP address for the logical anycast gateway 38 formed by the gateway nodes 15(1)-15(4)).

Returning to block 80, if the gateway node 15(1) determines that the ARP request received from host node 25(1) is a multicast ARP request (i.e., not a unicast request), then at 95 the gateway node 15(1) updates its ARP cache 50(1). The multicast ARP request received at gateway node 15(1) will also be received at the other gateway nodes 15(2)-15(4). However, it is beneficial to ensure that only one of the gateway nodes 15(1)-15(4) responds to the ARP request (i.e., ensure that host node 25(1) only receives one ARP response). Therefore, the ARP processing at each of the gateway nodes 15(1)-15(4) is modified such that after receipt of a multicast ARP request, each of the gateway nodes 15(1)-15(4) performs an operation to determine if it should respond to the multicast ARP request.

This operation is shown in FIG. 2 at 100 where the gateway node 15(1) determines if it is the designated responding node (designated responder) for the received multicast ARP request. The determination of whether gateway node 15(1) (or any gateway node) should respond to a multicast ARP request may be based on a combination of packet parameters and configuration information. For example, gateway node 15(1) could use the source IP address and/or the source MAC address in the received ARP request (e.g., to compute a hash value) to determine if gateway 15(1) should respond to the ARP request. Alternatively, the gateway node 15(1) could use the port or other information to determine if gateway 15(1) should respond to the ARP request. In general, the host nodes 25(1)-25(7) are divided into groups/segments and each of the gateway nodes 15(1)-15(4) could be the designated responder for one of the host node groups. In the example of FIG. 2, the packet parameters and/or configuration information is used to determine the host node group to which host node 25(1) belongs.

If gateway node 15(1) determines that it is not the designated responder for host node 25(1), then method 70 ends as one of the other gateway nodes 15(2)-15(4) will respond to the multicast ARP request. However, if gateway node 15(1) determines that it is the designated responder for host node 25(1), then gateway node 15(1) responds to the received ARP request by providing the host node 25(1) with the anycast gateway virtual MAC address and the anycast gateway virtual IP address (i.e., the MAC and IP address for the logical anycast gateway 38 formed by the gateway nodes 15(1)-15(4)).

Figure 3:
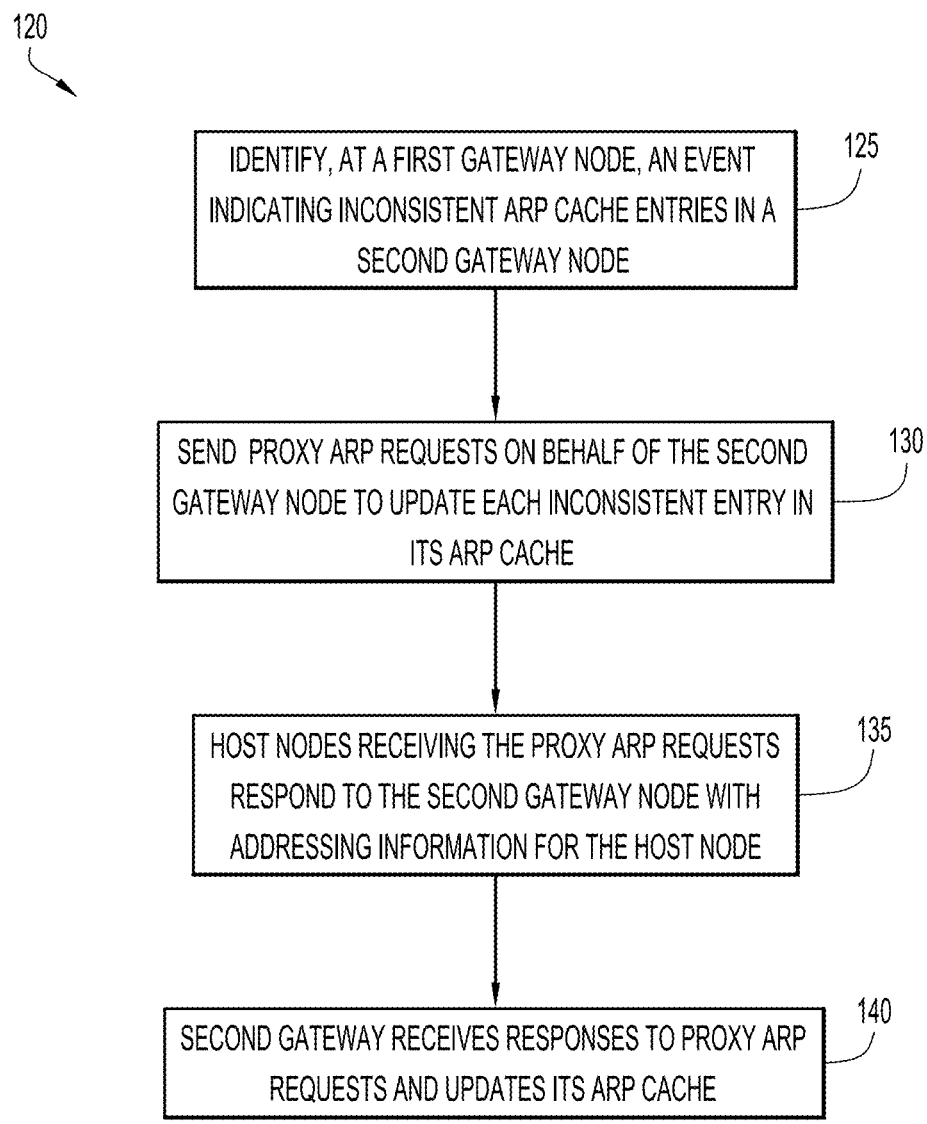
FIG. 3 is a detailed flowchart illustrating a method for proxy updating of a peer gateway node forming part of an anycast gateway, according to an example embodiment.

FIG. 3 is a flowchart illustrating a method 120 for proxy updating of peer gateway nodes in accordance with examples presented herein. Method 120 begins at 125 where a first gateway node, such as gateway node 15(1), identifies or detects a triggering event indicating that the ARP cache of a peer gateway node may include entries that are inconsistent with the entries in the ARP cache of the first gateway node. As used herein, inconsistent ARP cache entries refer to corresponding ARP entries (e.g., ARP entries that are associated with the same host node) in the peer ARP caches that have different address values or simply where one entry is vacant, but should include an address value.

Inconsistent ARP entries may arise, for example, when a new gateway node comes online, when the ARP cache of a second gateway node is deleted, when a first gateway node receives a packet that was sent by, or is directed to, a host not previously known by the first gateway, etc. In the scenario in which a new gateway node or a deleted ARP cache in a second gateway node, the gateway node may have an empty or substantially empty ARP cache. In the scenario in which the first gateway node receives a packet that was sent by, or is directed to, a host not previously known by the first gateway, the first gateway will add the addressing to its ARP cache. After the addressing information is added to the ARP cache in the first gateway node, the ARP cache of the second gateway node will be inconsistent since the host node was also likely previously unknown by the second gateway node. As such, the triggering event detected by the first gateway node may be an indication that a new gateway node has come online, an indication that a new host node is present in the overlay network, etc.

FIG. 3 illustrates a specific arrangement where gateway node 15(1) detects a triggering event indicating that gateway node 15(4) has come online. In other words, in the specific example of FIG. 3, gateway nodes 15(1)-15(3) initially form the anycast gateway and gateway node 15(4) is subsequently added to the anycast gateway. The triggering event detected by gateway node 15(1) at 125 may be, for example, receipt of an HSRP/VRRP discovery message.

When gateway node 15(1) detects that gateway node 15(4) has come online, gateway node 15(1) determines that the ARP cache for gateway node 15(4) is likely empty and needs to be populated before gateway node 15(4) can properly forward traffic. Therefore, at 130, a proxy ARP request is initiated by one or more of gateway nodes 15(1), 15(2), or 15(3) on behalf of gateway node 15(4) for each inconsistent entry in the ARP cache 50(4) of gateway node 15(4). That is, for each entry in ARP cache 50(4) that needs to be updated (e.g., each entry that is empty or incorrect), a corresponding proxy ARP request is initiated to the host node associated with that entry. These proxy ARP requests are not sent by gateway node 15(4), but rather are sent for gateway node 15(4) by one or more of gateway nodes 15(1), 15(2), or 15(3). In other words, the gateway nodes 15(1), 15(2), or 15(3) operate as "proxies" for gateway node 15(4).

In certain examples, a single gateway node may operate as proxy for gateway node 15(4) to transmit the ARP requests on behalf of gateway node 15(4). In other examples, the proxy ARP operations may be split between two or more of the gateway nodes 15(1), 15(2), or 15(3). For example, as noted above, the host nodes 25(1)-25(7) may be divided into groups/segments where a single gateway node is the designated responder for the host nodes in different groups. Because, in the example of FIG. 3, gateway nodes 15(1)-15(3) initially form the anycast gateway, the groups of host nodes may be divided between gateway nodes 15(1)-15(3). No host node group is associated with gateway node 15(4) as it was just brought online and added to the anycast gateway. Therefore, in certain examples the designated responder node operates at the proxy to send proxy ARP requests on behalf of gateway node 15(4) for the host nodes within its associated host node group. As such, one gateway node can send all the ARP requests, or the other peer gateway nodes can split up the ARP requests and each send ARP requests to certain hosts (e.g., one third each based on who is the designated responder).

The proxy ARP requests sent by one or more of gateway nodes 15(1), 15(2), or 15(3) are sent to the corresponding host nodes. The unicast MAC address for gateway node 15(4), which is unique to gateway node 15(4), is included in the proxy ARP requests such that, at 135, the host nodes send their ARP responses to gateway node 15(4) only (i.e., unicast ARP response sent to the MAC address of gateway node 15(4)). At 140, gateway node receives the ARP responses and updates its ARP cache 50(4) using the received addressing information. After completion of the proxy ARP update, gateway node 15(4) has the addressing information needed to forward traffic on VXLAN 40.

In the scenario in which gateway node 15(4) first comes online or has a deleted ARP cache, a large number of proxy ARP requests may be initiated on behalf of gateway node 15(4). Some rate limiting may be implemented at the one or more of gateway nodes 15(1), 15(2), or 15(3) to ensure that gateway node 15(4) is not overwhelmed by a large number of substantially concurrently received ARP responses from various host nodes.

In summary of FIG. 3, through the use of the proxy ARP requests, the peer gateway nodes 15(1), 15(2), or 15(3) can cause indirect updating of gateway node 15(4). These eliminates the need for protocol based direct synchronization between the gateways.

Figure 4:
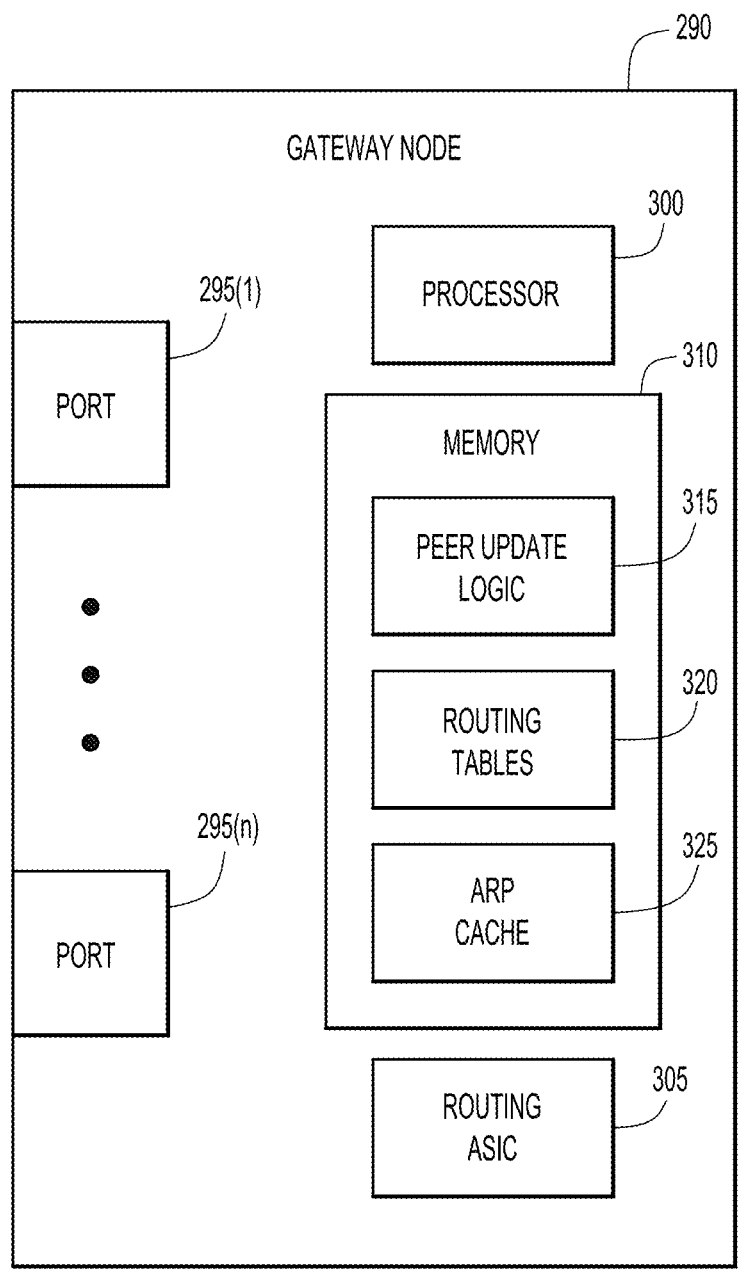
FIG. 4 is a block diagram of a gateway node in accordance with an example embodiment.

FIG. 4 is a functional block diagram of a gateway node 2900 configured to execute indirect peer update operations in accordance with aspects described herein. Gateway node 290 may be, for example, a router. Gateway node 290 router 290 comprises a plurality of ports 295(1)-295(n), a processor 300, a routing application specific integrated circuit (ASIC) 305, and a memory 310. The routing ASIC 305 is a hardware device that performs various packet forwarding/routing operations. Memory 310 stores instructions for one or more software modules including peer update logic 315, one or more routing tables 320, and ARP cache 325. Memory 310 may comprise read only memory (ROM), random access memory (RAM), magnetic disk storage media devices, optical storage media devices, flash memory devices, electrical, optical, or other physical/tangible (e.g., non-transitory) memory storage devices. The processor 300 is, for example, a microprocessor or microcontroller that executes instructions for the peer update logic 315. Thus, in general, the memory 310 may comprise one or more tangible computer readable storage media (e.g., a memory device) encoded with software comprising computer executable instructions and when the software is executed (by the processor 300) it is operable to perform the operations described herein for execution of the indirect peer update techniques.

Figure 5:
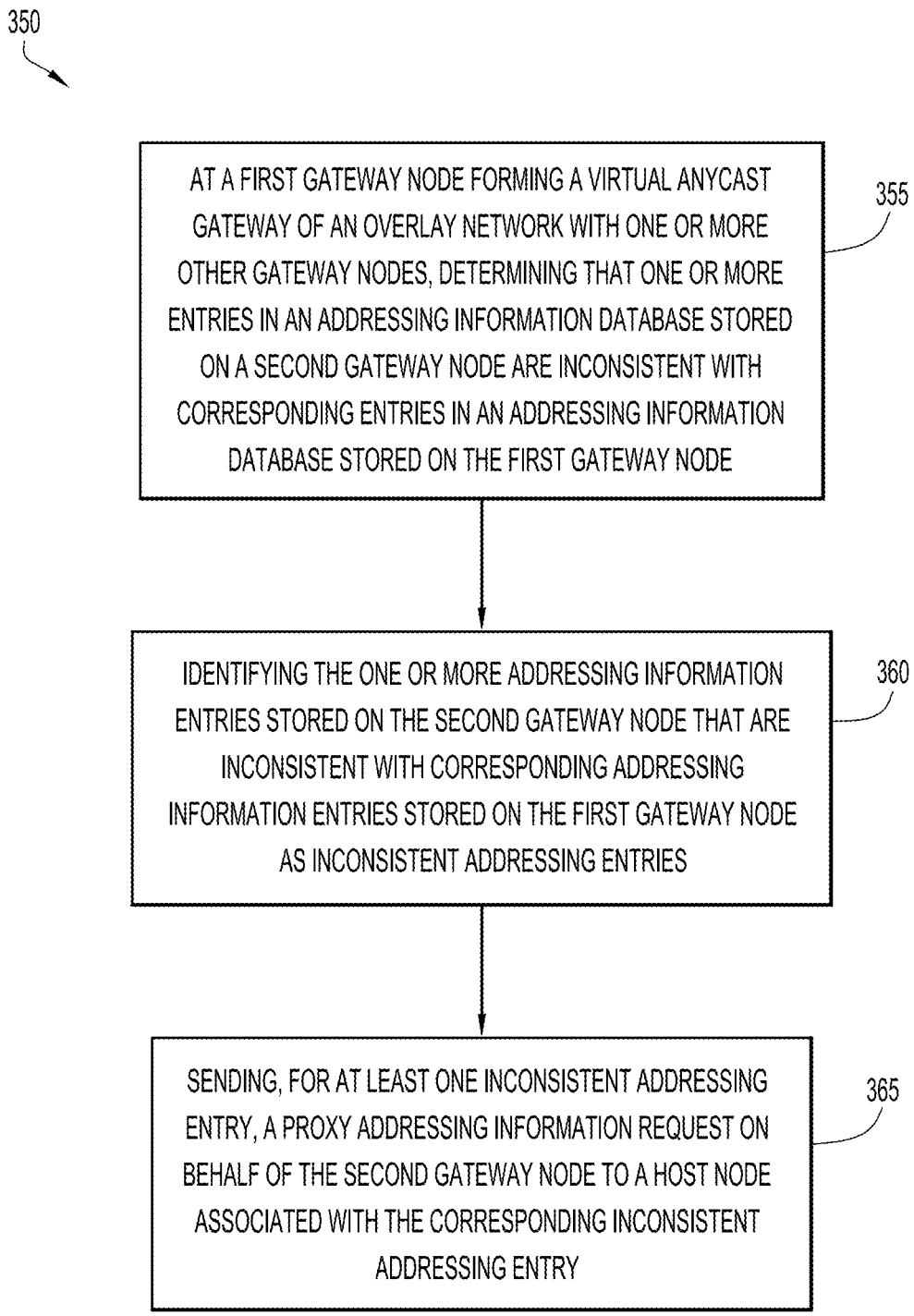
FIG. 5 is a high level flowchart of a method according to an example embodiment.

FIG. 5 is a flowchart of an indirect peer update method 350 in accordance with examples presented herein. Method 350 begins at 355 where a first gateway node forming a virtual anycast gateway of an overlay network with one or more other gateway nodes determines that one or more entries in an addressing information database stored on a second gateway node are inconsistent with corresponding entries in an addressing information database stored on the first gateway node. At 360, the first gateway node identifies the one or more addressing information entries stored on the second gateway node that are inconsistent with corresponding addressing information entries stored on the first gateway node as inconsistent addressing entries. This identification may, for example, an estimate as to which entries in one or more addressing information entries stored on the second gateway node are likely to be inconsistent with corresponding addressing information entries stored on the first gateway node. At 365, for at least one inconsistent addressing entry, a proxy addressing information request on behalf of the second gateway node to a host node associated with the corresponding inconsistent addressing entry.

To summarize, a method is provided comprising: at a first gateway node forming a virtual anycast gateway of an overlay network with one or more other gateway nodes, determining that one or more entries in an addressing information database stored on a second gateway node are inconsistent with corresponding entries in an addressing information database stored on the first gateway node; identifying the one or more addressing information entries stored on the second gateway node that are inconsistent with corresponding addressing information entries stored on the first gateway node as inconsistent addressing entries; and sending, for at least one inconsistent addressing entry, a proxy addressing information request on behalf of the second gateway node to a host node associated with the corresponding inconsistent addressing entry.

Similarly, an apparatus is provided comprising: a plurality of network ports configured to operate as part of a virtual anycast gateway and to receive packets on an overlay network; a memory configured to store an addressing information database; and a processor configured to: determine that one or more entries in an addressing information database stored on a peer gateway node are inconsistent with corresponding entries in the addressing information database stored in the memory; identify the one or more addressing information entries stored on the peer gateway node that are inconsistent with corresponding addressing information database entries stored in the memory as inconsistent addressing entries; and generate, for at least one inconsistent addressing entry, a proxy addressing information request to be sent via one of the network ports on behalf of the peer gateway node to a host node associated with the corresponding inconsistent addressing entry.

Further still, one or more computer readable storage media are provided encoded with software comprising computer executable instructions and when the software is executed operable to: at a first gateway node forming a virtual anycast gateway of an overlay network with one or more other gateway nodes, determine that one or more entries in an addressing information database stored on a second gateway node are inconsistent with corresponding entries in an addressing information database stored on the first gateway node; identify the one or more addressing information entries stored on the second gateway node that are inconsistent with corresponding addressing information entries stored on the first gateway node as inconsistent addressing entries; and generate, for at least one inconsistent addressing entry, a proxy addressing information request to be sent on behalf of the second gateway node to a host node associated with the corresponding inconsistent addressing entry.

The above description is intended by way of example only.

What is claimed is:

1. A method comprising:
at a first gateway node forming a virtual anycast gateway of an overlay network with one or more other gateway nodes, determining that one or more entries in an addressing information database stored on a second gateway node are inconsistent with corresponding entries in an addressing information database stored on the first gateway node;
identifying the one or more addressing information entries stored on the second gateway node that are inconsistent with corresponding addressing information entries stored on the first gateway node as inconsistent addressing entries; and
sending, for at least one inconsistent addressing entry, a proxy addressing information request on behalf of the second gateway node to a host node associated with the corresponding inconsistent addressing entry.

2. The method of claim 1, wherein sending a proxy addressing information request on behalf of the second gateway node comprises:
sending, for each inconsistent addressing entry, a proxy addressing information request on behalf of the second gateway node to a host node associated with the corresponding inconsistent addressing entry,
wherein each of the proxy addressing information requests is sent by one of the one or more gateway nodes that are part of the virtual anycast gateway and that are not the second gateway node.

3. The method of claim 1, wherein sending a proxy addressing information request on behalf of the second gateway node comprises:
including a unicast Media Access Control (MAC) address for the second gateway node in the proxy addressing information request.

4. The method of claim 3, further comprising:
in response to a received addressing information request, sending an addressing information response to the unicast MAC address of the second gateway node.

5. The method of claim 4, further comprising:
receiving the addressing information response at the second gateway node; and
updating the addressing information database stored on a second gateway node using addressing information in the addressing information response.

6. The method of claim 1, wherein sending a proxy addressing information request on behalf of the second gateway node comprises:
sending an Address Resolution Protocol (ARP) request configured to cause a receiving host node to generate an ARP response.

7. The method of claim 1, wherein sending a proxy addressing information request on behalf of the second gateway node comprises:
sending a Network Discovery Protocol (NDP) request configured to cause a receiving host node to generate an NDP response.

8. The method of claim 1, further comprising:
receiving, at the first gateway node, an addressing information request from a host node;
determining if the addressing information request is a unicast addressing information request or a multicast addressing information request; and
if the addressing information request is a unicast addressing request, generating an addressing information response that includes an anycast MAC address and an anycast Internet Protocol (IP) address for the virtual anycast gateway.

9. The method of claim 8, further comprising:
if the addressing information request is a multicast addressing information request, determining if the first gateway node is a designated responder for the host device;
if the first gateway node is the designated responder for the host device, generating an addressing information response that includes an anycast MAC address and an anycast Internet IP address for the virtual anycast gateway.

10. An apparatus comprising:
a plurality of network ports configured to operate as part of a virtual anycast gateway and to receive packets on an overlay network;
a memory configured to store an addressing information database; and
a processor configured to:
determine that one or more entries in an addressing information database stored on a peer gateway node are inconsistent with corresponding entries in the addressing information database stored in the memory;
identify the one or more addressing information entries stored on the peer gateway node that are inconsistent with corresponding addressing information database entries stored in the memory as inconsistent addressing entries; and
generate, for at least one inconsistent addressing entry, a proxy addressing information request to be sent via one of the network ports on behalf of the peer gateway node to a host node associated with the corresponding inconsistent addressing entry.

11. The apparatus of claim 10, wherein to generate a proxy addressing information request to be sent on behalf of the peer gateway node the processor is configured to:
generate, for each inconsistent addressing entry, a proxy addressing information request to be sent on behalf of the peer gateway node to a host node associated with the corresponding inconsistent addressing entry.

12. The apparatus of claim 10, wherein to generate a proxy addressing information request the processor is configured to:
include a unicast Media Access Control (MAC) address for the peer gateway node in the proxy addressing information request.

13. The apparatus of claim 10, wherein to generate a proxy addressing information request the processor is configured to:
generate an Address Resolution Protocol (ARP) request configured to cause a receiving host node to generate an ARP response.

14. The apparatus of claim 10, wherein to generate a proxy addressing information request the processor is configured to:
generate a Network Discovery Protocol (NDP) request configured to cause a receiving host node to generate an NDP response.

15. The apparatus of claim 10, wherein the processor is further configured to:
receive an addressing information request from a host node;
determine if the addressing information request is a unicast addressing information request or a multicast addressing information request; and if the addressing information request is a unicast addressing request, generate an addressing information response that includes an anycast MAC address and an anycast Internet Protocol (IP) address for the virtual anycast gateway.

16. The apparatus of claim 15, wherein the processor is further configured to:
   if the addressing information request is a multicast addressing information request, determine if the apparatus is a designated responder for the host device;
   if the apparatus is the designated responder for the host device, generate an addressing information response that includes an anycast MAC address and an anycast Internet IP address for the virtual anycast gateway.

17. One or more non-transitory computer readable storage media encoded with software comprising computer executable instructions and when the software is executed operable to:
   at a first gateway node forming a virtual anycast gateway of an overlay network with one or more other gateway nodes, determine that one or more entries in an addressing information database stored on a second gateway node are inconsistent with corresponding entries in an addressing information database stored on the first gateway node;
   identify the one or more addressing information entries stored on the second gateway node that are inconsistent with corresponding addressing information entries stored on the first gateway node as inconsistent addressing entries; and
   generate, for at least one inconsistent addressing entry, a proxy addressing information request to be sent on behalf of the second gateway node to a host node associated with the corresponding inconsistent addressing entry.

18. The non-transitory computer readable storage media of claim 17, further comprising instructions operable to:
   generate, for each inconsistent addressing entry, a proxy addressing information request to be sent on behalf of the second gateway node to a host node associated with the corresponding inconsistent addressing entry,
   wherein each of the proxy addressing information requests is generated by one of the one or more gateway nodes that are part of the virtual anycast gateway and that are not the second gateway node.

19. The non-transitory computer readable storage media of claim 17, wherein the instructions operable to generate a proxy addressing information request comprise instructions operable to:
   include a unicast Media Access Control (MAC) address for the second gateway node in the proxy addressing information request.

20. The non-transitory computer readable storage media of claim 17, wherein the instructions operable to generate a proxy addressing information request comprise instructions operable to:
   generate an Address Resolution Protocol (ARP) request configured to cause a receiving host node to generate an ARP response.

21. The non-transitory computer readable storage media of claim 17, wherein the instructions operable to generate a proxy addressing information request comprise instructions operable to:
   generate a Network Discovery Protocol (NDP) request configured to cause a receiving host node to generate an NDP response.

* * * * *